Nov. 9, 1965 R. JARDINE 3,217,228
BATTERY CHARGING CIRCUIT
Filed May 11, 1962
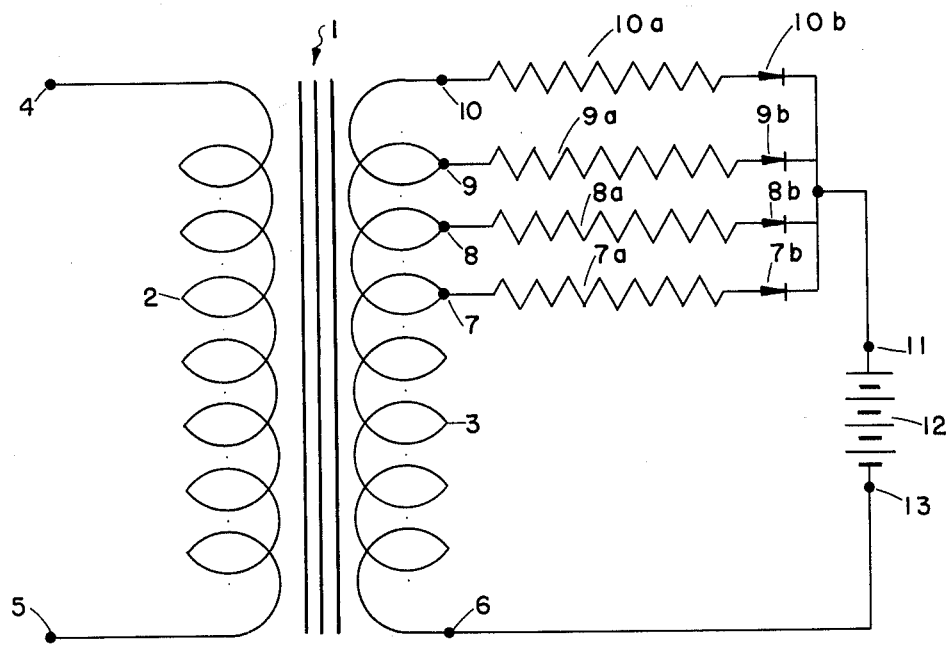
INVENTOR.
Ray Jardine ically bear no fixed relationship to each other. It is to be expressly understood, however, that the drawings and description are for the purposes of illustration only and are not to be construed as defining the limits of the invention, reference being had to the appended claims for that purpose.

3,217,228
BATTERY CHARGING CIRCUIT
Ray Jardine, Glenside, Pa., assignor to The Electric Storage Battery Company, a corporation of New Jersey
Filed May 11, 1962, Ser. No. 194,041
3 Claims. (Cl. 320—53)

The present invention generally relates to rectifying circuits. More specifically, the present invention is concerned with a rectifying circuit particularly adapted for the charging of storage batteries.

The rate at which a storage battery can be charged is governed for the most part by the ability of the battery to accept charge and the amount of gassing and the temperature rise which can be tolerated. Any input to a battery under charge which is in excess of that which the battery can accept is wasted in gassing and, accordingly, it is desirable in most applications and essential when charging sealed batteries that this condition be minimized. Because the charge acceptance of a battery is greatest when the battery is discharged and decreases as it accepts charge, it is customary to begin charging at a high rate of current and to decrease the charging rate either gradually or in a stepwise fashion as the battery approaches a full state of charge. Since the voltage of a storage battery increases as the battery accepts charge, it has heretofore been proposed to sense battery voltage and to control the charging rate in accordance with that voltage. This method of charging is known as constant-potential charging. Many systems have been devised to accomplish this, however, for the most part these systems rely upon mechanical relays, generally of the voltage sensitive or temperature sensitive type, to control the charging rate and to terminate charge. Such relay controlled charging systems are complicated and expensive.

It is an object of the present invention to provide a battery charging circuit which is adapted to charge a battery at a rate controlled by the voltage of the battery being charged.

It is another object of the present invention to provide a battery charging circuit of the type described which does not employ mechanical relays to control the charging rate and which is economical to produce and which is characterized by simplicity of construction.

Still another object of the present invention is to provide a charging circuit adapted to charge a battery at a rate tapered to substantially correspond with the voltage of the battery being charged.

In accordance with the present invention there is provided a battery charging circuit having a plurality of rectifying paths, each containing a diode, connected to the terminals of the battery to be charged and biased with progressively increasing voltage magnitudes derived from taps on the secondary winding of the charging circuit transformer. In operation, as the voltage of the battery being charged increases, more and more of the parallel rectifying circuits are rendered non-conductive. Each of the rectifying circuits is provided with a current limiting resistor which can be selected to control the current supplied to the battery in a predetermined manner as the number of parallel paths supplying charging current to the battery is decreased as a result of the diodes being rendered successively non-conductive with increasing battery voltage.

A better understanding of the present invention may be had from the following description when read with reference to the accompanying drawing which is a circuit diagram of a battery charging circuit in accordance with the present invention.

Referring now to the drawing, the numeral 1 generally designates a transformer having a primary winding 2 and a secondary winding 3. The primary winding 2 has a pair of terminals 4 and 5 adapted to be connected to a suitable source of alternating current. The secondary winding 3 has a pair of terminals 6 and 10 and a plurality of intermediate voltage taps 7, 8, and 9 respectively. As shown, one of a plurality of rectifying circuits, each comprising a resistor connected in series with a diode, is connected to the terminal 10 and one to each of the intermediate taps 7, 8, and 9 of the secondary winding 3. Thus, the resistor 7a and diode 7b are connected to the tap 7, the resistor 8a and diode 8b are connected to the tap 8, the resistor 9a and diode 9b are connected to the tap 9 and the resistor 10a and a diode 10b are connected to the terminal 10. The diodes 7b, 8b, 9b, and 10b are connected together and to the positive terminal 11 of the rectifier circuit which is adapted to be connected to the positive terminal of the battery 12, the battery to be charged. The terminal 6 of the secondary winding 3 is connected to the negative terminal 13 of the charging circuit which is adapted to be connected to the negative terminal of the battery 12.

The battery charging circuit shown in the drawing is a half-wave rectifying circuit which delivers a charging current to the battery 12 when the polarity of the alternating current applied across the input terminals 4 and 5 of the primary winding 2 is such that the taps 7, 8, 9, and the terminal 10 of the secondary winding 3 are positive with respect to the terminal 6. The turns-ratio of the primary winding 2 with respect to the secondary winding 3 is selected to provide a voltage across the secondary winding 3 suitable for charging the battery 12. Similarly, the positions of the intermediate voltage taps 7, 8, and 9 with respect to the winding 3 are selected to provide the desired charging taper in accordance with the resistance of the parallel rectifying circuits connected to the respective ones of these voltage taps.

In operation, as the battery 12 accepts charge its terminal voltage rises and when it reaches a value such that it is larger than the voltage applied across the diode 7a from the tap 7 of the secondary winding 3 the diode 7a becomes back biased and non-conductive. This effectively disconnects the resistor 7a from the charging circuit. Accordingly, the resistance path of the charging current is changed by an amount which can be proportioned by the selection of the resistance of the resistors 7a, 8a, 9a, and 10a. Similarly, as the voltage of the battery 12 continues to increase, the diodes 8b and 9b and if desired, the diode 10b, become successively non-conductive. Accordingly, the charging current flows through a resistance path which can become progressively larger. With the proper selection of the voltage taps and associated rectifying circuit resistors this path can be made such as to approximate very accurately the charge acceptance characteristics of the battery under charge. In practice it has been found possible to provide a charging circuit having three charging paths which is operable to provide a tapered charge starting at several hundred milliamps when charging a completely discharged 6-volt battery of the lead-acid type which will taper to a few millilamps as that battery approaches a full state of charge.

It should be understood, that while the embodiment of the present invention shown in the drawing has been illustrated as having four parallel rectifying paths, that the number of such paths may be increased or decreased and the value of the charging circuit resistors so proportioned as to achieve a charging current and voltage characteristic which can be adapted to provide an almost infinite variety of charging programs. Depending on the proportioning of the resistance in the rectifying paths, the ratings of the diodes 7b through 10b need not necessarily be identical. As will be appreciated by those skilled in the art, the unique charging characteristics made available through the use of the circuitry described is achieved without resort to mechanical relays or temperature sensing devices which have heretofore characterized circuits performing in the manner discussed.

Having now described the invention, that which is claimed as new is:

1. A battery charging circuit comprising a transformer having a primary winding adapted to be connected to a source of alternating current and a secondary winding connected to a pair of terminals adapted for connection to the battery to be charged, a plurality of rectifying paths concurrently connecting said secondary winding to one of said terminals, each of said rectifying paths being energized from said secondary winding at a different voltage and each path comprising a separate current limiting resistor and a separate diode and circuit means connecting the other of said pair of terminals to said secondary winding to supply a charging current to the battery to be charged each of said rectifying paths becoming nonconductive when there is no potential difference across the diode to vary the rate of charging current supplied to the battery in accordance to the voltage of the battery being charged.

2. A battery charging circuit comprising a pair of output terminals adapted to be connected to the battery to be charged, a plurality of rectifying paths connected to one of said output terminals, each of said rectifying paths comprising a resistor connected in series with a diode, and a transformer having a primary winding and a secondary winding, each of said rectifying paths being connected to said secondary winding for energization at a different voltage, the terminal of said secondary winding opposed to said connections to said rectifying paths being connected to the other of said output terminals, said primary winding being adapted to be connected to a source of alternating current, said energizing voltages for said rectifying paths being so selected that said diodes are selectively rendered non-conductive as the voltage of the battery being charged rises during charging the values of said resistors in said rectifying paths being selected to charge said battery in a predetermined manner.

3. A battery charging circuit having a pair of input terminals adapted to be connected to a suitable source of alternating current and a pair of output terminals adapted to be connected to the battery to be charged comprising, in combination, a transformer having a primary winding and a secondary winding, said primary winding being connected across said input terminals, said secondary winding being connected across said output terminals, a plurality of voltage taps on said secondary winding, and a plurality of rectifying paths each containing a diode, each of said rectifying paths being connected between a different one of said voltage taps and to a common one of said output terminals.

References Cited by the Examiner
UNITED STATES PATENTS

| | | | |
|---|---|---|---|
| 2,285,620 | 6/42 | Sears | 320—24 |
| 2,769,137 | 10/56 | Creusere | 235—197 |
| 2,889,504 | 6/59 | Spencer | 323—43.5 X |

MAX L. LEVY, *Primary Examiner.*